March 14, 1961 R. W. BOGLE 2,975,414
RADIO RANGING DEVICE
Filed Dec. 16, 1948 2 Sheets-Sheet 1

WITNESSES:
Ralph Carlisle Smith
Henry Heyman

INVENTOR:
Robert W. Bogle
BY
Roland A. Anderson
Attorney

March 14, 1961  R. W. BOGLE  2,975,414
RADIO RANGING DEVICE
Filed Dec. 16, 1948  2 Sheets-Sheet 2

WITNESSES:  INVENTOR:
Robert W. Bogle
BY

United States Patent Office 2,975,414
Patented Mar. 14, 1961

2,975,414

RADIO RANGING DEVICE

Robert W. Bogle, Silver Spring, Md., assignor to the United States of America as represented by the United States Atomic Energy Commission Filed Dec. 16, 1948, Ser. No. 65,692

8 Claims. (Cl. 343—13)

This invention relates broadly to a method and apparatus for effecting operations on a vehicle as a consequence of the approach to a selected intervening distance from another body. More particularly, it is directed to radio apparatus adapted to be carried on a vehicle for initiating a desired sequence of operations when the intervening space between the vehicle and a reflecting body is reduced to a selected value. It is highly desirable in the operation of certain types of moving vehicles, such as aircraft for instance, that means be provided whereby the occurrence of a pre-selected value of proximity to the surface of the earth or other foreign body effects the actuation of warning lights or steering modifying apparatus. Other vehicles in which the provision of such equipment is desirable to avoid collision are, for example, trains, ships and automobiles, in order that warning devices, reversed propulsion or brakes will be applied in the event that the vehicle approaches within a selected minimum distance of an object.

More particularly, there are certain vehicles, such as projectiles, in which the provision of apparatus for initiating a sequence of operations upon the occurrence of a pre-selected value of proximity to another body is a necessity. For instance, certain types of free-falling projectiles containing exposive material are most effective if detonated at a pre-determined distance above the objective.

The provision of apparatus for performing the above function on a vehicle is subject to certain requirements. The apparatus must possess accuracy, high sensitivity, compactness, lightness in weight and the ability to range at short distances.

It has been found that the super-regenerative circuit possesses particularly favorable characteristics for meeting the above requirements. Systems utilizing such a circuit have been disclosed in copending applications Serial No. 65,695, filed December 16, 1948, now abandoned, and Serial No. 65,696, filed December 16, 1948. The referenced applications disclose ranging devices which utilize a peculiar characteristic of the super-regenerative circuit for sensing the occurence of the selected range.

This characteristic is the generation of noise under free-running conditions and the disappearance of noise generation under the condition that externally derived excitation of proper phase is impressed upon the circuit.

The behavior of the super-regenerative circuit or oscillator in the aforementioned manner may be understood from a brief consideration of operating conditions in the device.

The super-regenerative oscillator is an oscillatory circuit including a thermionic tube and a resonant circuit. In the self-quenching super-regenerative circuit, the tube is provided with a grid leak of such high value that the grid bias accumulated under oscillating conditions causes blocking after an interval of oscillation. The externally quenched super-regenerative circuit acts in a somewhat similar manner except that the termination of each oscillation is more precisely determined by the negative excursions of the quench wave.

After the tube is blocked and oscillations in the resonant circuit have collapsed, there is an interval of inaction during which the blocking bias on the grid is dissipated through the grid leak. After the grid bias has recovered to a value at which the building up of oscillations is again possible, the oscillations will begin, but only when the resonant circuit is given a small start. The small start may consist of either externally created thermal noise or excitations of proper phase from without. If there is no excitation from without the circuit and the thermal noise starts the circuit, there results a slight indefiniteness in the instant of the beginning of each successive operation. It follows that under this condition, the birth of succeeding groups of oscillations are not evenly spaced with respect to time and also that the groups of oscillations are of irregular duration.

This phenomenon is utilized by the provision of a filter adapted to pass energy corresponding to the irregularities and a rectifier for converting the irregularities into a unidirectional potential. Upon the impression on the circuit of excitation of a chartacer adapted to start the oscillations at uniform intervals, the unidirectional potential decreases or disappears and the decrease or disappearance of the potential is utilized as a controlling influence on appropriate indicating devices.

Externally derived excitation for starting each successive oscillation may be derived by directing energy from each preceding oscillation through a path having a length such that some of the energy is returned to the circuit at the proper instant to control a succeeding oscillation.

It follows that under the condition that the super-regenerative oscillator is provided with radiating and receiving means, it is capable of indicating the occurrence of that distance between itself and a reflecting object which so phases the received echo of energy of each emitted oscillation that the intervals between oscillations become uniform.

A ranging device of the present type preferably utilizes the oscillation sequence described in referenced disclosure Ser. No. 65,696 in which a radiation oscillation hereinafter termed the sending oscillation is followed by a sensing oscillation with an intervening ranging interval equal to twice the selected range divided by the velocity of light. Pair of oscillations so created are repeated with intervening time spaces of about 15 to 30 times longer than the ranging interval. The purpose of this sequence is the elimination of possible ambiguities arising from noise dips at regular multiples of the basic range such as would be obtained from an evenly pulsed system.

It has been found desirable to suppress or eliminate the detection of noise generated by the first or sending pulse of each pair of pulses. The reason for this is that upon the occurrence of the on-range condition, the noise generation of the second or sensing pulse decreases to a low value or disappears and this effect is diminished in the presence of noise generated by the sending pulse. In the last mentioned referenced disclosure, elimination of noise generation by the sending pulse is accomplished by an auxiliary high frequency oscillator which impresses a control wave on the super-regenerative oscillator only during the sending pulse. This system, although useful and practical, suffers from the difficulty involved in making adjustments in the radio frequency elements at high frequencies. It has been found desirable to provide a means for suppressing the noise generated by the sending pulse other than by an auxiliary high frequency oscillator.

The super-regenerative oscillator ranging device has definite advantages over super-heterodyne radar systems in that ranging at much shorter distances is possible.

This advantage lies in the fact that the super-regenerative detector "listens" only for a very small fraction of the duration of the second pulse, while the super-heterodyne "listens" for the entire duration of the second pulse. The reason for this is that the sensing interval of the super-regenerative oscillator is of extremely short duration occurring just at the start of the sensing oscillation.

In order that advantage may be taken of the flexibility in ranging capabilities of the super-regenerative circuit, it is desirable to provide for adjustability in the length of the ranging interval in order to admit of adjustability in the selection of the on-range distance.

It is, therefore, an object of this invention to provide a simplified radio ranging device for accurately indicating a selected range.

Another object is the utilization of a super-regenerative circuit for ranging.

It is still another object of this invention to provide a ranging device which indicates the occurrance of a selected intervening separation between the device and a relatively moving object and in which the value of separation at which indication occurs can be modified at will.

Another object of this invention is the provision of means in a light weight ranging device for effecting selected operations in response to the diminution of intervening distance to a pre-selected value between the device and a foreign body.

Still another object of this invention is to provide super-regenerative apparatus capable of generating an electric quantity upon the occurrence of a selected intervening distance between the apparatus and an approaching body.

Still another object is to provide switching means for causing an indication, or for initiating desired operations in response to the electric quantity generated by a super-regenerative apparatus when the intervening distance between the device and a foreign body is a selected value.

Another object is the provision of modulating means for generating positive unidirectional pulses adjustably spaced in time for activating a super-regenerative ranging device.

Further objects and features of the invention will become apparent to those skilled in the art upon reference to the accompanying specification, claims, and drawing in which:

Figure 1:
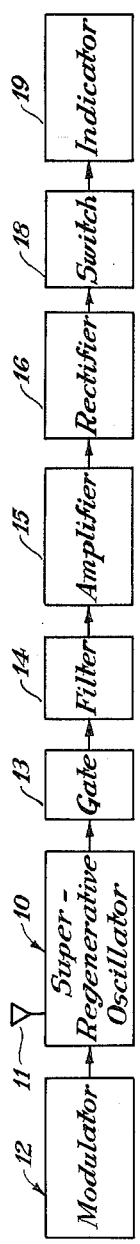
Figure 1 shows in block form a complete ranging device in accordance with the present invention.

Referring to Figure 1, a working radar system utilizing the super-regenerative principle arranged in accordance with the present invention is shown in block form. This system comprises a super-regenerative oscillator 10 having coupled thereto an antenna 11, a modulator 12 adapted to activate the super-regenerative oscillator with two "on-pulses" of short duration and closely spaced in time with a relatively long wait between each set of double pulses. In order that the unsuppressed noise of the first oscillation of each pair will not obscure the suppression of noise upon ranging of the second oscillation of each pair, a gating circuit 13 is coupled to the oscillator.

The gating circuit permits only the noise energy of the second or sensing oscillations of each pair to pass on to the indicating portion of the apparatus. Following the gating circuit, a filter 14 is provided to eliminate energy of the modulation and microphonic frequencies. The filtered noise energy is processed in amplifier 15 and rectified in rectifier 16 wherein a unidirectional current is derived when the apparatus is not on-range. The unidirectional current or a potential translated therefrom is impressed on a switch 18 which may be a potential responsive thermionic or gas discharge tube.

An indicator 19 or other device capable of performing a desired operation is connected to switch 18 whereupon the indication or desired operation is obtained upon the occurrence of the on-range condition.

Figure 2:
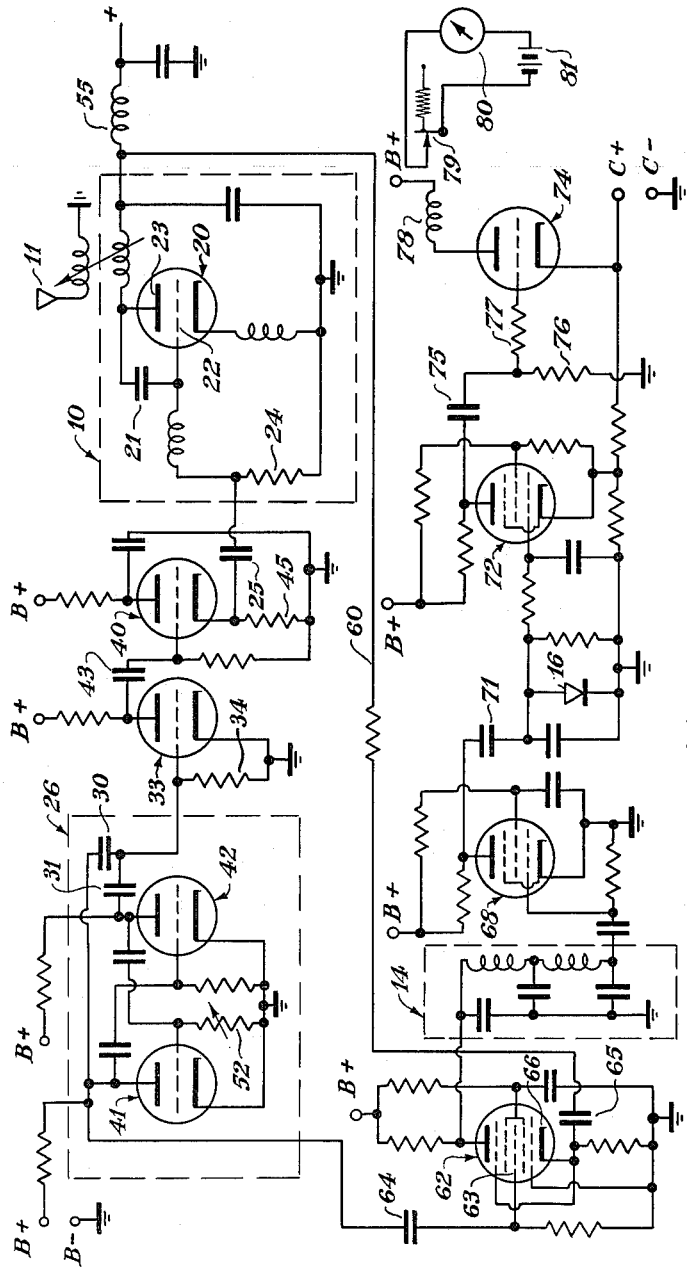
Figure 2 is a circuit diagram of a preferred embodiment of a complete ranging device constructed in accordance with the present invention.

A detailed description of the composition and operation of the several components of the device is now given with reference to Figure 2.

The radio frequency oscillator 10 is of the Ultra-Audion type with the tank circuit connected between plate and grid. The working frequency is preferably high, in the neighborhood of 600 megacycles, at which frequency a single small condenser and its leads constitute the resonant tank circuit. The oscillation generator comprises thermionic tube 20 and tank circuit 21. Tube 20 contains the usual grid 22 and anode 23. Grid 22 is provided with a grid leak 24 and a modulation input condenser 25.

The super-regenerative ranging device of the present invention in a broad sense comprises a transmitter for emitting short bursts of radio frequency energy, and a receiver tuned to the transmitter frequency. The receiver is sensitive for only a short period some time after emission of the transmitter pulses. That is, the receiver will respond to transmitter signals reflected from surfaces $$\frac{2T}{C} \text{ meters}$$

away, C being the velocity of light in meters per second and T being the time in seconds between the transmitter and receiver activation. The super-regenerative ranging device is unique in that a single radio frequency oscillator performs the duties of both transmitter and receiver.

In operation, a single oscillator is turned on for a very short interval, turned off, and turned on again at a time equal to twice the selected ranging distance divided by the velocity of light to "listen" for a reflected signal. This signal is repeated many times, such as, 40,000 per second. If the intervening distance between the receiver and the reflecting object is the selected range, the incoming signal suppresses the noise ordinarily generated under free-running conditions in the super-regenerative oscillator. Under the condition that the intervening distance is other than the selected range, the reflected pulse of radio frequency energy is impressed upon the circuit before or after oscillation has started and therefore, noise will be generated by irregularity in the succeeding oscillations.

Positive pulses are derived from the modulator and are impressed on the grid input condenser. Under the influence of the positive pulses and oscillation. Grid rectification takes place and provides the negative bias necessary to keep the oscillator tube 20 well below cut-off during the intervals between modulation pulses. To this end, the product of the capacitance of coupling condenser 25 and the combined resistance of the grid leak 24 and cathode biassing resistor 45 is proportioned to provide a time constant somewhat longer than the repetition interval.

The power oscillator is released to start each oscillation by the cancellation of the negative grid bias by a positive modulation pulse, and is abruptly stopped at the termination of the modulation pulse by the high negative charge accumulated on the grid in the manner previously described.

The ranging ability of the device for short periods is dependent on certain circuit characteristics. For instance, the circuit is necessarily arranged so that the oscillatory condition incident to sending a signal toward an object will have disappeared and the sensing or receiving condition prevail at the time the echo is received. Therefore, the duration of the sending oscillation, and the length of the ranging interval are essential characteristics which determine the shortest range to which the device can respond.

The theory of oscillation starting and decay has been presented in the reference copending application Ser. No. 65,696 and is incorporated herein by reference. The minimum ranging interval $T_r$ of the device is related to the circuit characteristics in accordance with the following relation $$T_r = \frac{2D \text{ min.}}{C} > \log_e \frac{E \text{ max.}}{E \text{ noise}} \times \frac{Q}{\pi f} + t_s$$

wherein $T_r$ is the pulse duration, Q is the Q of the oscillator tank circuit, $f$ is the working frequency, E max. is the peak oscillatory voltage and E noise is determined from the relation $$E^2 \text{ noise} = \frac{KT}{C}$$

where K is Boltzmann's constant $1.37 \times 10^{-28}$ joules per degree absolute, T is the absolute temperature in degrees Kelvin and C is the capacitance in the circuit.

By reference to the foregoing relation, it is noted that several of the factors are subject to change. It is seen that the ranging interval and therefore, the ranging distance, can be reduced by reducing the Q of the oscillatory circuit. The effective Q of the power oscillator 10 depends on loading. The minimum range to which the device can respond can therefore be decreased within practical limits by increasing the coupling between the antenna 11 and the oscillatory circuit.

The oscillator generator is activated by pairs of positive input pulses coupled through condenser 25. The term activated as herein used means the decreasing of the cut-off bias to a point at which the oscillator is able to oscillate if started by a suitable stimulus. The stimulus, under the condition of off-range, is thermal agitation and, under the condition of on-range, is the receipt of reflections in proper phase of the sending oscillations.

The production of the paired modulation pulses is accomplished by the use of a multi-vibrator 26, a mixing tube 33 and a coupling tube 40. The pulses generated at the anodes of each of the tubes 41 and 42 are of the usual form shown by Figure 3, curves A and B respectively, and are coupled to the mixing tube 33 through small condensers 30 and 31. The values of the condensers 30 and 31 when taken with the grid leak 34 are such as to compose an RC coupling network which passes only the highest frequency included in the primary pulses. The pulses passed by condensers 30 and 31 are sharpened and take the shape shown in Figures 3–C and 3–D respectively.

Figure 3:
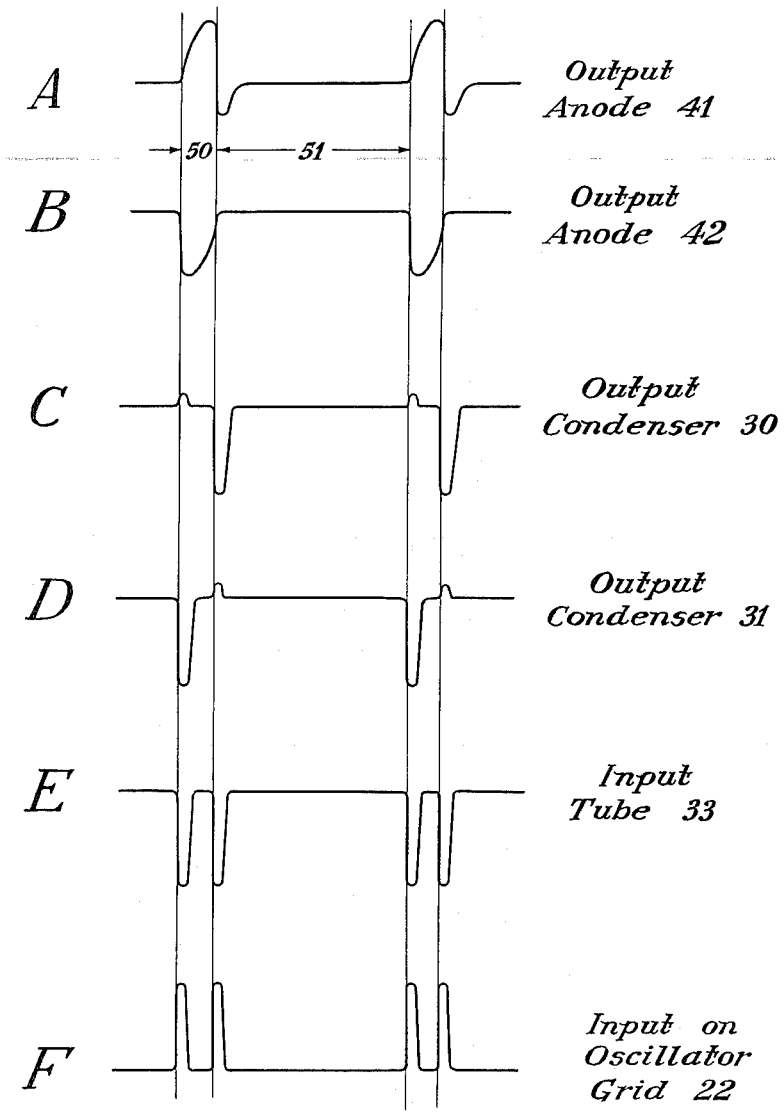
Figure 3 is a series of curves showing voltages present in different parts of the modulator.

It follows that by using the common grid leak 34, the pulses are combined to create the desired double pulse shown in Figure 3, curve E.

The pulses are inverted and amplified in tube 33, and the amplified pulses appearing at the anode now have the form shown in Figure 3, curve F. These positive pulses are impressed on the grid of the coupling tube 40 via condenser 43. The positive pulses impressed on the grid are reproduced in like phase across the cathode resistor 45 and are coupled therefrom to the modulation input condenser 25. Referring again to Figure 3, curves A, B and F, it is noted that the time interval 50 represents the ranging interval and the time interval 51 represents the repetition interval. It is also to be noted that the ranging interval 50 and the repetition interval 51 represent the original time constants of the multi-vibrator; that is, the periods controlled by coupling condensers and grid leaks. Since this is so, it is apparent that the repetition rate and, more important, the ranging distance, may be controlled solely by the variation of a grid leak resistor.

It follows that the provision of variable resistor 52 in the grid circuit of multi-vibrator tube 41 results in an extremely simple and effective means for adjusting the selected ranging distance of the entire ranging device.

It should be noted that varying only one of the grid resistors to vary the ranging distance affects the repetition rate. This change alter the total noise output somewhat. If it is desired to compensate for the change in one grid resistor as the ranging interval is changed, the other grid resistor may be made variable and the two variable resistors ganged together. By this means, using ordinary linear potentiometer type rheostats, it is possible to retain the repetition rate at very nearly the selected value over the entire range of adjustment in ranging interval.

Thus far in the description, apparatus has been described in which a super-regenerative oscillator is activated for a sending pulse followed, after a selected ranging interval, by a sensing condition. The sensing condition being the creation by the oscillator of oscillations at even or uneven intervals in accordance with the absence or receipt of externally derived energy of proper phase.

As previously noted, the output of the oscillator consists of a noise signal generated by the random starting of the oscillator except in the on-range condition. This signal contains essentially all frequencies for which the plate load of the oscillator presents a significant impedance.

The signal corresponding to the random starting of the oscillator must be amplified for subsequent use in the switching circuit, and extraneous energy of other frequencies must be eliminated.

One form of extraneous energy is microphonic disturbances having frequencies below 5000 cycles. The principal source of this type of disturbance arises in the oscillator tube. To the end that this type of disturbance is reduced or eliminated, the anode 23 is provided with a load impedance 55 broadly tuned by its self-capacitance so as to present an insignificant impedance to energy in the microphonic range.

A second form of extraneous noise energy to be eliminated is that created by the sending oscillations in the output of the power oscillator. This noise is not suppressed even in the on-range condition, and in order to prevent the obscuring of the noise decrease obtained from the sensing oscillations during the on-range condition, a gating stage is provided to block noise energy derived from the sending oscillations.

The gating stage comprises a mixing tube 62 which is shown to be of pentagrid type although other types of tubes having at least one control grid can be used. This tube contains a control grid 63 upon which is impressed through small condenser 64 sharpened gating signals derived from that side of the modulator multi-vibrator from which the sending pulses are derived. The noise energy from the power oscillator is impressed on the cathode 66 via conductor 60 and condenser 65. The purpose for impressing the noise energy on cathode 66 instead of on a control grid is that the major part of the noise energy is in the form of high voltage negative pulses which if applied to a grid might result in blocking the tube at the time of both sending and sensing oscillations.

The amplified noise energy of the sensing oscillations is filtered in low-pass filter 14 which is designed to attenuate frequencies created by the modulation pulses and to pass the noise frequencies. This filter is followed by a conventional amplifier stage including tube 68 which brings the signal up to a desired working level.

The noise energy present at the anode of tube 68 is coupled to a rectifier 16 by means of coupling condenser 71. The rectifier 16 is included in a low-pass network. That is, as the vehicle carrying the device passes through an on-range condition, the rectified potential decreases to a minimum and then increases at a rate depending upon the velocity of the vehicle and that distance during which the ranging device is affected by the received echo. For instance, if the vehicle approaches a reflecting object with a velocity of 600 feet per second and the pulse width is 100 feet, the period of the rate of change of rectified potential is in the neighborhood of 3 cycles per second. This filter is preferably designed to provide a voltage attenuation of 0.707 at the lower and upper ends of the pass-band which are 1 cycle and 20 cycles respectively.

The unidirectional ranging potential thus created is impressed on direct coupled amplifier tube 72 to thereby obtain an enlarged magnitude of unidirectional potential for actuating a switch tube 74.

The amplifier is biassed negatively by the application of a positive potential C+ on the cathode. With a noise signal present, the actual grid voltage is brought back to just zero. The grid may not become positive since beyond zero grid voltage, grid current flows and the equivalent low input impedance shorts out any further signal from the rectifier system. This saturation is useful in producing a stabilizing effect under the off-range conditions.

The switch tube 74 is coupled to amplifier tube 72 by means of a network having a relatively long time constant. For instance, in the preferred embodiment, the network comprising condenser 75 and resistors 76 and 77 are so related as to provide actuation of tube 74 for a selected interval of 0.25 second. A relay actuating coil 78 is in series with the anode circuit of tube 74 to thereby cause the closure of relay contacts 79 upon the occurrence of the on-range condition. A suitable indicator 80 and source of energizing power 81 therefore is provided in series with the relay contacts.

The switch tube is biassed negatively by the application of a positive potential C+ on the cathode. The positive voltage impressed on the grid upon the occurrence of the on-range condition is in excess of that needed to close the relay 79 so that a positive operation of the relay is obtained.

It will be understood that by this invention, a preferred embodiment of which is described above, a ranging device is provided which is capable of relating the time between the generation in an oscillator of a first oscillation and a second oscillation to the round trip distance through which energy of the first oscillation travels in order to return to the oscillator at the instant of birth of the second oscillation.

It will thus be seen that there has been provided by this invention a method and apparatus in which the various objects hereinabove set forth are successfully achieved. As various possible embodiments might be made of the mechanical features of the above invention, and as the art herein described might be varied in various parts, all without departing from the scope of the invention, it is to be understood that all matter hereinbefore set forth or shown in the accompanying figures of the drawing is to be interpreted as illustrative and not in a limiting sense.

What is claimed is:

1. In a radio ranging device, a super-regenerative circuit having alternately a transmitting and a sensing phase of operation, an antenna coupled to said circuit for emitting energy when said circuit is in the transmitting phase, and for receiving and impressing on said circuit received signals; a rectifier, means for coupling said rectifier to said super-regenerative circuit, means for blocking said means for coupling said rectifier to said super-regenerative circuit during the transmitting phase of operation whereby said rectifier creates a unidirectional potential during only the sensing phase, and potential responsive indicating means coupled to said rectifier whereby it is adapted to indicate receipt of reflected signals during the sensing phase of operation.

2. In a radio ranging device, a super-regenerative circuit having alternate phases of wave energy sending and wave energy sensing, means coupled to said circuit to radiate said sending wave energy and to intercept impinging wave energy, said super-regenerative circuit being adapted to generate wave energy at unequal intervals during the wave energy sensing phase in the absence of impinging energy of proper phase and to generate wave energy at equal intervals in the presence of impinging energy of proper phase; a rectifier, coupling means connecting said rectifier to said super-regenerative circuit, means connecting said rectifier to said super-regenerative circuit for disabling said coupling means during the sending phase whereby a unidirectional potential is created during the sensing phase only by said rectifier in the absence of impinging energy.

3. In a radio ranging device, a super-regenerative oscillator and an indicator, said super-regenerative oscillator having first and second phases of oscillation spaced in time by a ranging interval and having the characteristic in which the second phase of oscillations becomes regular in occurrence and duration upon the impression upon said circuit of energy of proper phase, antenna means connected to said oscillator to couple the same with a transmission medium whereby energy is adapted to be radiated by said oscillator during the first oscillation phase toward a reflecting object, and means including a gating stage for coupling said indicator to said super-regenerative oscillator; means for blocking said gating stage during the first oscillation phase whereby said indicator is adapted to indicate the occurrence of regularity of the second phase of oscillation only to thereby establish the presence of said reflecting object at a distance equal to one half the product of the ranging interval times the velocity of light.

4. In a radio ranging device, a super-regenerative oscillator circuit having transmitting and sensing phases of operation, an antenna coupled to said circuit for emitting energy when said circuit is in the transmitting phase, and for receiving and impressing on said circuit externally derived signals, means connected to said oscillator for generating a bias potential for rendering the oscillator normally quiescent, modulator means coupled to said oscillator for impressing thereon a first activating pulse for transmitting and a second activating pulse for sensing; a rectifier and a potential responsive indicator, a first coupling means connecting said rectifier to said oscillator, means coupling said modulator means to said first coupling means only during the first activating pulse to thereby disable the first coupling means whereby said rectifier generates a unidirectional potential in response only to the sensing phases of operation, and means for connecting said indicator to said rectifier.

5. In a radio ranging device, a super-regenerative oscillator having an antenna coupled thereto; modulation means for generating positive pulses alternately spaced by a ranging interval and a repetition interval, means for impressing said positive pulses on said super-regenerative oscillator whereby said oscillator has a period of wave energy generation for sending followed by a period of sensing wave energy generation; a gating circuit, means for impressing a negative pulse at the beginning of each ranging interval on said gating circuit to block the same, means for coupling said super-regenerative oscillator to the input of said gating circuit, a rectifier and means for coupling the rectifier to the output of said gating circuit whereby irregularities in wave energy generated by said super-regenerative oscillator during the sensing periods only is impressed on said rectifier and a unidirectional potential corresponding to said irregularities is derived therefrom.

6. In a radio ranging device, a super-regenerative oscillator circuit having transmitting and sensing phases of operation, an antenna coupled to said circuit whereby the circuit is adapted to transmit energy when in the transmitting phase and to detect externally derived energy when in the sensing phase, means for impressing a potential on said oscillator circuit to render it normally quiescent, a pulse generator adapted to generate a first pulse and a second pulse spaced by an interval of time equal substantially to twice the selected ranging distance divided by the velocity of light, means for impressing the pulses on the oscillator circuit whereby said first pulse activates the oscillator circuit into transmitting a burst of radiant energy and the second pulse activates the oscillator circuit into a sensing condition for the detection of the echo of said burst of radiant energy as reflected from the object at the ranging distance; a rectifier; means for coupling said rectifier to said oscillator circuit including a gating circuit, and means for impressing on said gating circuit a disabling pulse derived from the pulse-generator first pulse to thereby disconnect the rectifier from the oscillator circuit during the transmitting phases of operation whereby said rectifier generates a unidirectional electrical quantity in response only to the sensing phases of operation.

7. In a radio ranging device, a super-regenerative circuit having alternate phases of wave generation and wave energy sensing, means coupled to said circuit adapted to radiate said generated wave energy and to intercept impinging energy, means for impressing a bias potential on said oscillator circuit to render it normally quiescent, means for generating pairs of spaced positive pulses spaced by a repetition interval, the first and the second pulse of each pair being spaced in time by a ranging interval equal substantially to twice a selected range divided by the velocity of light, and said repetition interval being long in duration compared to the ranging interval, means for impressing said pulses on said oscillator circuit to activate the same into a condition of wave generation whereby said oscillator circuit is adapted to radiate energy toward an object as a consequence of the first pulse of each pair of pulses and to sense the presence of the object at the selected range by the receipt of energy reflected from said object by said oscillator circuit within a short interval subsequent to the occurrence of the second pulse; said means for generating pairs of spaced positive pulses including a multi-vibrator and means for varying the period of oscillation of said multi-vibrator to thereby vary the duration of the ranging interval.

8. In a radio ranging device, a super-regenerative oscillator having an antenna coupled thereto; modulator means for generating positive pulses alternately spaced by a ranging interval and a repetition interval, means for impressing said positive pulses on said super-regenerative oscillator whereby said oscillator has a period of wave energy sending followed at the end of the ranging interval by a period of wave energy sensing; said modulator means comprising a multi-vibrator having a first and a second tube in a circuit of the cross-coupled grid anode type, phase inverting mixing means, a condenser connecting each of the anodes in the multi-vibrator to the mixing means whereby a sequence of positive pulses is produced, means coupling the mixing means to the oscillator so that the pulse initiating the ranging interval corresponds to the pulse created by the first tube of said multi-vibrator; a gating circuit including a tube having at least a control grid and a cathode, means coupling the anode of the first of said multi-vibrator tubes to said control grid, and means coupling the oscillator to said cathode whereby said gating circuit is disabled during the period of wave energy sending; said gating circuit tube having an anode; an amplifier, and means for impressing energy corresponding to the sensing period appearing on the anode of said gating tube on said amplifier; a rectifier coupled to said amplifier, switch means connected to said rectifier and to an indicator whereby an electrical quantity created by said oscillator during the sensing phase upon the occurrence of the on-range condition causes said switch tube to energize said indicator.

References Cited in the file of this patent

UNITED STATES PATENTS

| | | |
|---|---|---|
| 2,193,868 | Geiger | Mar. 19, 1940 |
| 2,373,145 | Sensiper et al. | Apr. 10, 1945 |
| 2,419,620 | Young | Apr. 29, 1947 |
| 2,422,382 | Winchel | June 17, 1947 |
| 2,431,344 | Reeves | Nov. 25, 1947 |
| 2,452,549 | Cleeton | Nov. 2, 1948 |
| 2,471,413 | Cleeton | May 31, 1949 |

FOREIGN PATENTS

| | | |
|---|---|---|
| 581,168 | Great Britain | Oct. 3, 1946 |
| 581,982 | Great Britain | Oct. 31, 1946 |